(12) United States Patent
Lew et al.

(10) Patent No.: US 7,197,960 B2
(45) Date of Patent: *Apr. 3, 2007

(54) METHOD AND SYSTEM FOR GENERATING A CALL PROCESSING CONTROL RECORD

(75) Inventors: Gavin Sueo Lew, Bartlett, IL (US); Thomas Steven Woods, Niles, IL (US)

(73) Assignee: SBC Properties L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/141,702

(22) Filed: May 31, 2005

(65) Prior Publication Data

US 2006/0029201 A1 Feb. 9, 2006

Related U.S. Application Data

(63) Continuation of application No. 10/676,856, filed on Sep. 29, 2003, now Pat. No. 6,928,153, which is a continuation of application No. 09/144,600, filed on Aug. 31, 1998, now Pat. No. 6,658,103.

(51) Int. Cl.
*H04M 3/42* (2006.01)

(52) U.S. Cl. ............................. 79/207.02; 379/220.01; 379/76

(58) Field of Classification Search ............... 379/67.1, 379/76, 84, 88.16, 88.19, 88.2, 88.22, 88.23, 379/88.25, 201.01, 201.03, 207.02, 211.01, 379/211.02, 220.01, 221.08, 229, 355.01
See application file for complete search history.

(56) References Cited

U.S. PATENT DOCUMENTS

| | | | | |
|---|---|---|---|---|
| 5,060,255 A | 10/1991 | Brown | .................... | 379/88.22 |
| 5,243,645 A | 9/1993 | Bissell et al. | .......... | 379/211.02 |
| 5,276,731 A | 1/1994 | Arbel et al. | ........... | 379/211.02 |
| 5,297,189 A | 3/1994 | Chabernaud | ................ | 455/461 |
| 5,327,486 A | 7/1994 | Wolff et al. | .............. | 379/93.23 |
| 5,329,578 A | 7/1994 | Brennan et al. | ........ | 379/211.03 |
| 5,408,528 A | 4/1995 | Carlson et al. | ......... | 379/211.02 |
| 5,416,834 A | 5/1995 | Bales et al. | ............ | 379/211.02 |
| 5,426,634 A | 6/1995 | Cote et al. | .................. | 370/360 |
| 5,434,908 A * | 7/1995 | Klein | ...................... | 379/88.23 |
| 5,436,963 A | 7/1995 | Fitzpatrick et al. | .... | 379/218.01 |
| 5,452,347 A | 9/1995 | Iglehart et al. | ............. | 379/199 |
| 5,504,804 A | 4/1996 | Widmark et al. | .......... | 455/63.2 |
| 5,553,128 A | 9/1996 | Grimes | .................. | 379/211.02 |
| 5,555,291 A | 9/1996 | Inniss et al. | ............. | 379/88.13 |

(Continued)

OTHER PUBLICATIONS

Article, *Technique For Initiating A Conference Call From A Calendar Database*, IBM Corp. 1991.

*Primary Examiner*—Ovidio Escalante
(74) *Attorney, Agent, or Firm*—Brinks Hofer Gilson & Lione

(57) ABSTRACT

A method and system enable the automatic generation of a call processing control record. A user creates a schedule entry comprising a plurality of data entries on an electronic scheduler. The data entries are transmitted from the electronic scheduler to a call processing control record generator. The data entries are compared with stored data. In response to the data entries, the call processing control record generator generates a call processing control record which can be stored in a call processing control record database. The call processing control record can be used to forward calls or transmit an announcement to the calling party.

21 Claims, 10 Drawing Sheets

U.S. PATENT DOCUMENTS

| | | | |
|---|---|---|---|
| 5,572,581 A | 11/1996 | Sattar et al. | 379/201.05 |
| 5,583,564 A | 12/1996 | Rao et al. | 348/14.01 |
| 5,592,541 A | 1/1997 | Fleischer, III et al. | 379/211.02 |
| 5,610,970 A | 3/1997 | Fuller et al. | 455/417 |
| 5,652,789 A | 7/1997 | Miner et al. | 379/201.1 |
| 5,703,940 A | 12/1997 | Sattar et al. | 379/201.05 |
| 5,757,899 A | 5/1998 | Boulware et al. | 379/196 |
| 5,832,062 A | 11/1998 | Drake | 379/88.16 |
| 5,862,209 A | 1/1999 | Kapsales | 379/214.01 |
| 5,915,008 A | 6/1999 | Dulman | 379/221.08 |
| 5,933,778 A | 8/1999 | Buhrmann et al. | 455/461 |
| 5,958,016 A | 9/1999 | Chang et al. | 709/229 |
| 6,052,438 A | 4/2000 | Wu et al. | 379/67.1 |
| 6,134,454 A | 10/2000 | Foladare et al. | 455/556.2 |
| 6,266,399 B1 | 7/2001 | Weller et al. | 379/88.19 |
| 6,279,000 B1 * | 8/2001 | Suda et al. | 707/10 |
| 6,310,947 B1 | 10/2001 | Polcyn | 379/211.01 |
| 6,928,153 B2 | 8/2005 | Lew et al. | 379/207.02 |

* cited by examiner

METHOD AND SYSTEM FOR GENERATING A CALL PROCESSING CONTROL RECORD

This application is a continuation of prior application Ser. No. 10/676,856, filed Sep. 29, 2003 now U.S. Pat. No. 6,928,153, which is a continuation of application Ser. No. 09/144,600, filed Aug. 31, 1998, U.S. Pat. No. 6,658,103, all of which are incorporated by reference herein.

BACKGROUND

The present invention relates generally to telecommunications services and more particularly to call processing.

Call forwarding systems that forward incoming calls based upon the day of the week on which and/or the time of day during which incoming calls are received are well known. For example, U.S. Pat. No. 5,592,541 to Fleischer III et al., describes a system that forwards incoming calls based upon the date and/or the time of day a call is received. The calls are forwarded in response to a call processing control record that can be created by a user. To create the call processing records, the user utilizes his/her telephone to sequentially transmit data in the form of dual-tone multi-frequency (DTMF) input to a telecommunications network. The data typically consists of the telephone number to which incoming calls are to be forwarded along with date and time of day during which such forwarding should occur. This data is received by the network and is used to create the call processing control record that contains the information provided by the user. The call processing control record can be used to forward incoming calls. The forwarding of incoming calls in response to the call processing control record can typically be activated and deactivated through input commands, such as DTMF input, provided by the user. Other call forwarding systems require the user to provide the same type of information to the network via voice input.

Call forwarding systems such as these suffer from a common problem associated with the time and effort required to create the call processing control records. These types of systems require the user to create the call processing control records by entering the data required to produce the call processing control record. The user is typically required to sequentially input the necessary data through the use of a telephone or by providing voice input. This process can be cumbersome and time consuming, especially when multiple call processing control records must be created by a user.

Accordingly, an improved system and method are needed for creating call processing control records that overcome these deficiencies.

DETAILED DESCRIPTION OF THE PRESENTLY PREFERRED EMBODIMENTS

By way of introduction, the preferred embodiments described below include a method and system for creating a call processing control record. Electronic schedulers have become an increasing popular way for users to keep track of upcoming events such as meetings and appointments. Electronic schedulers allow the user to create a schedule that includes one or more schedule entries that include details about the meetings, appointments, or other events that are scheduled to take place. Each schedule entry typically comprises a plurality of data entries such as the date or dates that the event is scheduled to occur, the starting time of the event, the ending time of the event, the location of the event, the title of the event and the attendees of the event. The user typically enters the appropriate data into the electronic scheduler to create the schedule entry. In addition to the above data entries, the schedule entry may include one or more telephone numbers designated by the user or an announcement identifier designated by the user. This data can also be used to create call processing control records without requiring the user to duplicate hi/her efforts by entering the same data a second time.

In one embodiment, an electronic scheduler containing a schedule comprising at least one schedule entry can transmit data to a call processing control record generator. The data preferably comprises the plurality of data entries described herein. The call processing control record generator generates a call processing control record in response to the data received from the electronic scheduler. The call processing control record preferably comprises a starting date, an ending date, a starting time of day, an ending time of day, and one or more call forwarding telephone numbers or an announcement identifier. The call processing control record enables calls received on a specific date and/or at a specific time of day to be forwarded to a call forwarding telephone number. Alternatively, the call processing control record can enable the transmission of announcements to a calling party when a call is received on a specific date and/or at a specific time of day.

Figure 1:
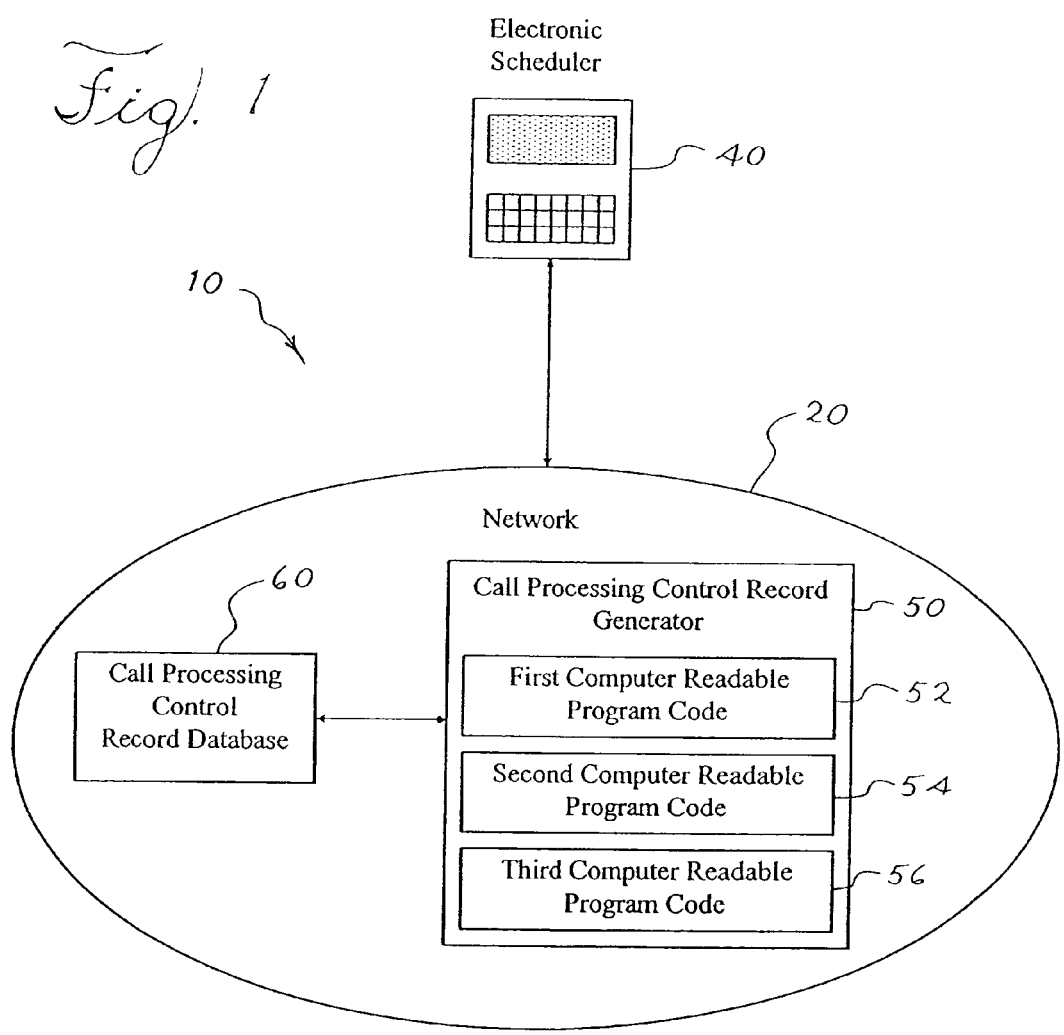
FIG. 1 is a block diagram of a telecommunications system of a preferred embodiment.

By way of example, FIG. 1 depicts a system 10 of a preferred embodiment. The system 10 comprises a network 20 and an electronic scheduler 40 removably coupled with the network 20. The term "coupled with," as used herein, means directly coupled with or indirectly coupled with through one or more components.

The network 20 preferably comprises a call processing control record generator 50 and a call processing control record database 60. The call processing control record generator 50 preferably comprises a computer usable medium having first, second, and third computer readable program codes 52, 54, 56 embodied therein. It is important to note that while the call processing control record generator 50 and the program codes 52, 54, 56 have been shown as separate elements, their functionality can be combined and/or distributed. It is also important to note that "medium" is intended to broadly include any suitable medium including analog or digital, hardware or software, now in use or developed in the future. The network 20 preferably further comprises a telecommunications network as known to those skilled in the art. Alternatively, the network 20 can comprise a computer network such as the Internet, or any other network that is adapted to transmit, store and retrieve information.

The call processing control record database 60 preferably comprises a telecommunications network storage element as known to those skilled in the art. According to an alternative embodiment, the call processing control record database 60 can comprise any suitable storage element adapted for use in the present embodiments. The call processing control record database 60 can be located within the network 20 or external to the network 20.

The electronic scheduler 40 preferably comprises a personal computer running a scheduler software program such as Outlook, Schedule+, ACT!, Sidekick or other suitable scheduler software programs as known to those skilled in the art. According to an alternative embodiment, the electronic scheduler 40 can comprise a portable electronic scheduler such as a Palm Pilot, a hand-held personal computer, or a palm-size personal computer as known to those skilled in the art. Alternatively, the electronic scheduler 40 can comprise any combination of hardware and/or scheduler software.

Figure 2:
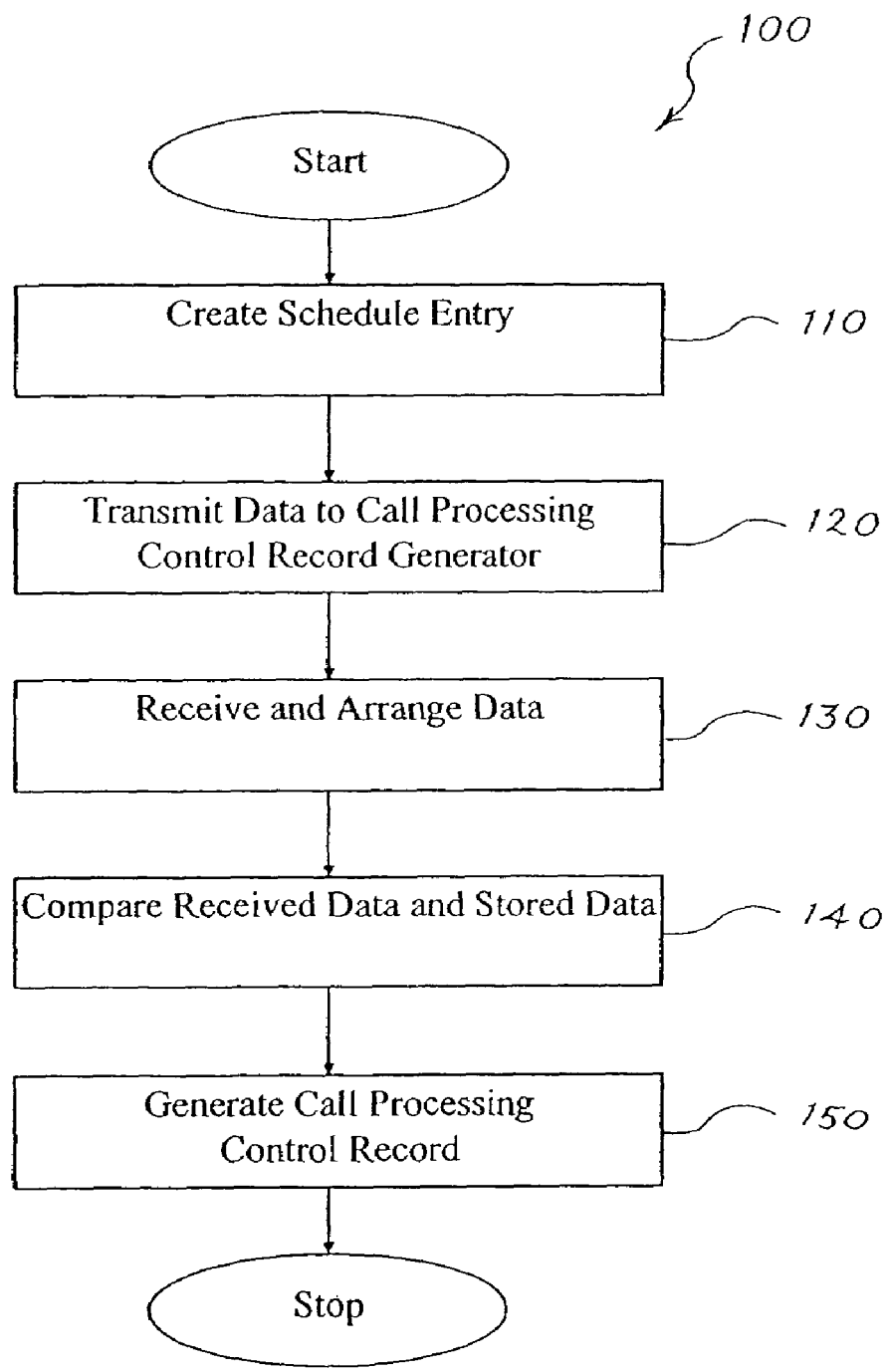
FIG. 2 is a flow chart of a method for generating a call processing control record of a preferred embodiment.

The system 10 of FIG. 1 can be used to implement the method 100 depicted in FIG. 2. a user creates or modifies at least one schedule entry comprising a plurality of data entries using the electronic scheduler 40 (step 110). The data entries preferably relate to a scheduled event and in this example comprise the starting date of the event, the ending date of the event, the time of day on which the event begins, the time of day on which the event ends, and one or more telephone numbers designated by the user or an announcement identifier designated by the user. The one or more telephone numbers preferably comprise telephone numbers where the user can be reached during the event. The announcement identifier preferably identifies the specific announcement that the user has selected from a plurality of standard pre-recorded announcements or custom announcements that the user has recorded. The data entries can also comprise a subscriber identification. The subscriber identification can comprise a password that can be used to prevent unauthorized modification of the call processing control records.

The data entries created by the user are then transmitted from the electronic scheduler 40 to the call processing control record generator 50 (step 120). When the data entries are transmitted to the call processing control record generator 50, the first computer readable program code 52 receives the data and arranges the data into the appropriate data fields used in a call processing control record (step 130). The call processing control record preferably comprises a plurality of data fields including: a subscriber identification, one or more forwarding telephone numbers or an announcement identifier, the date on which the processing begins, the time at which processing begins, the time at which processing ends, the date on which the processing ends, a flag or counter, and one or more blank identifier fields. The blank identifier fields can be used to monitor and audit, for example, the number of calls forwarded and the number of calls completed. After the data has been deciphered, the second computer readable program code 54 compares the received data with the data, if any, that is presently stored in a current call forwarding control record (step 140). The received data and the stored data can be compared based upon current starting and/or ending dates and times. The received data can take precedence over stored data that corresponds to the same starting and/or ending dates and times. If the received data differs from the stored data, the third computer readable program code 56 generates a call processing control record (step 150) by replacing the stored in the appropriate data fields with the received data for the corresponding data fields. This type of call processing control record can be used by the network 20 to forward incoming calls placed to the user.

Figure 3:
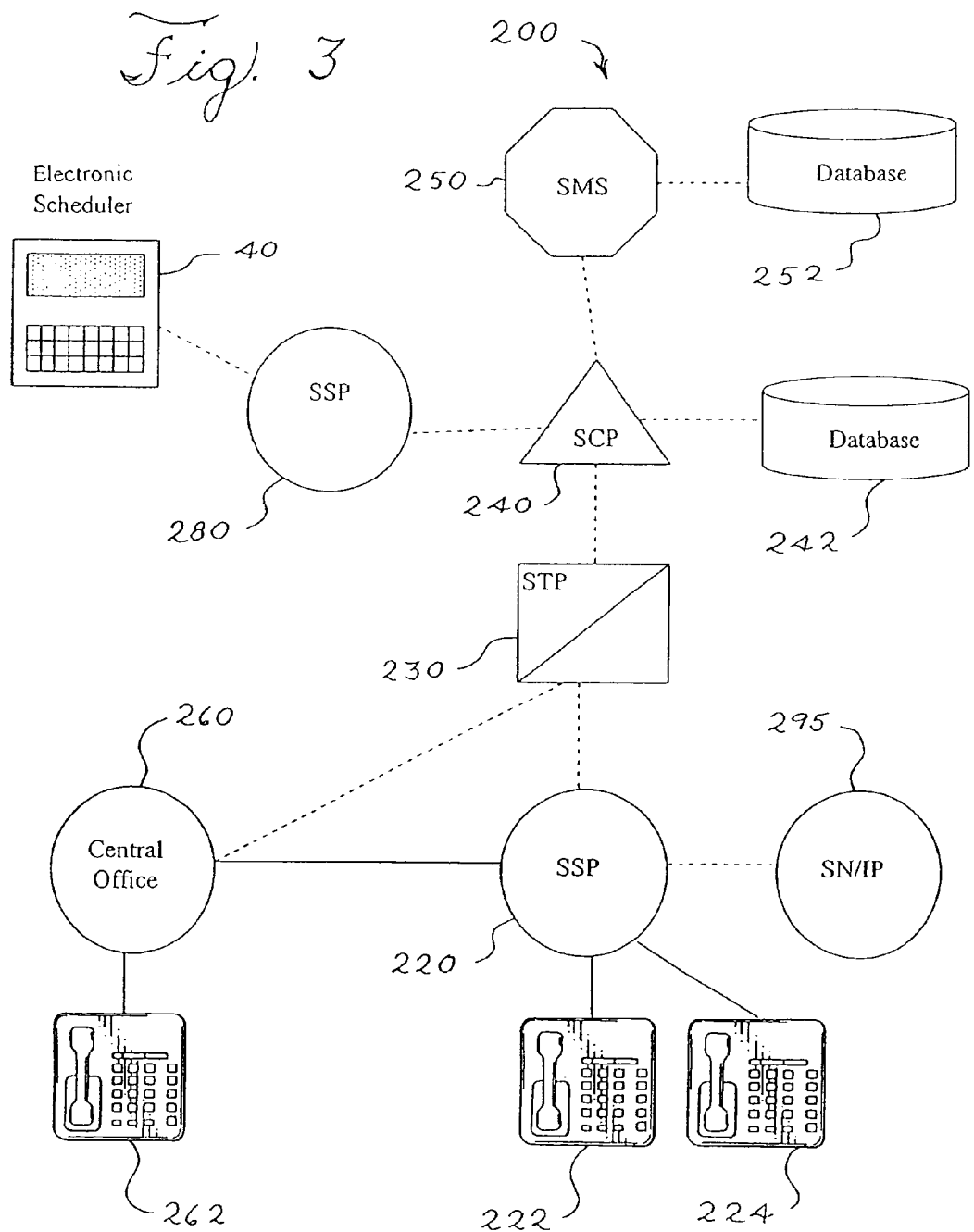
FIG. 3 is a block diagram of a first preferred embodiment of the telecommunications system of FIG. 1.

By way of further example, FIG. 3 depicts a preferred embodiment of the system 10 described above. The system 200 comprises service switching points (SSPs) 220, 280, a signal transfer point (STP) 230, a service control point (SCP) 240, a database 242, a service management system (SMS) 250, a SMS database 252, a service node/intelligent peripheral (SN/IP) 295, a central office 260, a called telephone station 222, a forwarding telephone station 224, a calling telephone station 262 and the electronic scheduler 40 as described above. In this embodiment, the electronic scheduler 40 is removably coupled with the SSP 280. Intelligent network system components, commonly referred to as advanced intelligent network (AIN) components, suitable for implementing the present embodiment are commercially available from many telecommunications component manufacturers and are know to those skilled in the art. AIN components can implement computer readable program code. Manufacturers of AIN components typically have a preferred programming language and operating platform.

SSPs 220, 280 preferably comprise AIN switches that route calls, recognize and respond to triggers, generate queries to obtain call information and respond to returned call information. SSP 220 connects called telephone station 222 with central office 260 to enable a customer at called telephone station 222 to place calls to and receive calls from telephone station 262. SSP 280 is adapted to be removably coupled with the electronic scheduler 40 to enable transmission of data between the electronic scheduler 40 and the SCP 240. SSPs 220, 280 preferably communicate with the other network elements in accordance with a signaling protocol such as Signaling System 7 (SS7) or other such signaling protocols is known to those skilled in the art or developed in the future. SSPs 220, 280 preferably generate queries to SCP 240 and receive responses from SCP 240.

In addition, SSP 220 may include a call forwarding number field for each of the telephone numbers assigned to SSP 220 as known to those skilled in the art. The call forwarding number field enables incoming calls to be automatically forwarded by SSP 220 to the telephone number included within the call forwarding number field when a call is placed to a particular telephone number. The inclusion of a telephone number within the call forwarding number field can be controlled by the SCP 240 or the SMS 250 as described herein.

STP 230 preferably comprises a network element that transfers signaling communications in accordance with signaling protocols such as SS7 as known to those skilled in the art. STP 230 preferably transfers queries from SSP 220 to SCP 240 and responses to the queries from SCP 240 to SSP 220.

SCP 240 preferably comprises an AIN element that stores call processing information and receives and responds to queries as known to those skilled in the art. SCP 240 preferably stores call processing information in database 242 and accesses the stored call processing information. SCP 240 can be configured to generate call processing control records as described herein and to store such call processing control records in database 242. SC 240 receives queries generated by SSP 220 and preferably responds to the queries by performing database searches to locate the requested call processing information. SCP 240 can forward the located call processing information to SSP 220.

In addition, SCP 240 can be used to control the inclusion of a telephone number within the call forwarding number field of SSP 220. In response to the creation of a call processing control record, SCP 240 can populate the call forwarding number field with the telephone number included within the call processing control record. The SCP 240 can also remove the telephone number from the call forwarding number field in response to the call processing control record.

SMS 250 preferably comprises a network element that stores and processes data and transmits data to and receives data from SCP 240. SMS 250 typically stores data required to properly generate bills for telecommunications services as known to those skilled in the art. SMS 250 can store data in and retrieve data from SMS database 252 as known to those skilled in the art. SMS 250 can be configured to generate call processing control records as described herein and store such call processing control records in SMS database 252. SMS database 252 can be configured internally within or externally of SMS 250 as known to those skilled in the art. Alternatively, SMS 250 can transmit data or call processing control records to SCP 240 as described herein.

In addition, SMS 250 can be used to control the inclusion of a telephone number within the call forwarding number field of SSP 220. In response to the creation of a call processing control record, SMS 250 can populate the call forwarding number field with the telephone number included within the call processing control record. The SMS 250 can also remove the telephone number from the call forwarding number field in response to the call processing control record.

Database 242 preferably comprises a data storage element for use with SCP 240 as known to those skilled in the art. Database 242 preferably stores call processing information that can be implemented by SSP 220 to control the processing of calls. Such call processing information is known to those skilled in the art. Database 242 can be configured internally within or externally of SCP 240 as known to those skilled in the art.

Central office 260 preferably comprises a network switches as known to those skilled in the art. Central office 260 connects telephone station 262 with SSP 220 to enable callers at telephone station 262 to place calls to and receive calls from the user at called telephone station 222. Alternatively, central office 260 can comprise a AIN network switch as known to those skilled in the art.

Telephone stations 222, 224, 262 preferably comprise analog telephone sets as known to those skilled in the art. Alternatively, telephone stations 222, 224, 262 can comprise wireless, PCS, ISDN or any other form of communication station known to those skilled in the art.

SN/IP 295 preferably comprises a network element that comprises hardware and software as known to those skilled in the art. SN/IP 295 can be used to record custom announcements and can store both custom announcements and standard pre-recorded announcements. SN/IP 295 can also transmit announcements to telephone stations 222, 224, 262 in response to a call processing control record as known to those skilled in the art.

Figure 4:
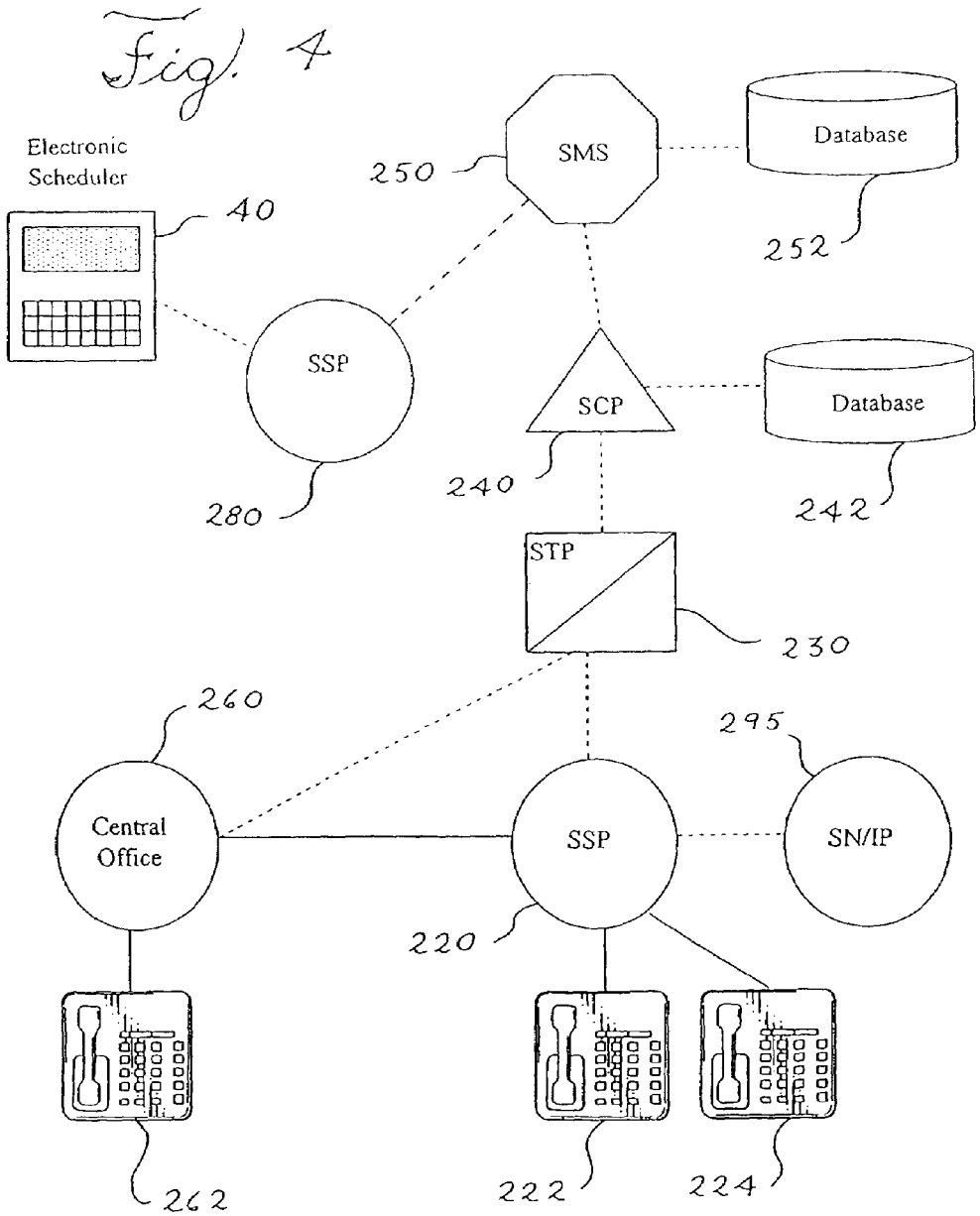
FIG. 4 is a block diagram of a second preferred embodiment of the telecommunications system of FIG. 1.

Referring now to FIG. 4, an alternate embodiment of the system of FIG. 3 is shown. In this embodiment, the electronic scheduler 40 can be removably coupled to SSP 280 to enable the transmission of data from the electronic scheduler 40 to SMS 250. SMS 250 can be adapted to generate call processing control records as described herein. Alternatively, SMS 250 can transmit the data received from electronic scheduler 40 to SCP 240 where SCP 240 can generate a call processing control record in response to the data as described herein.

Figure 5:
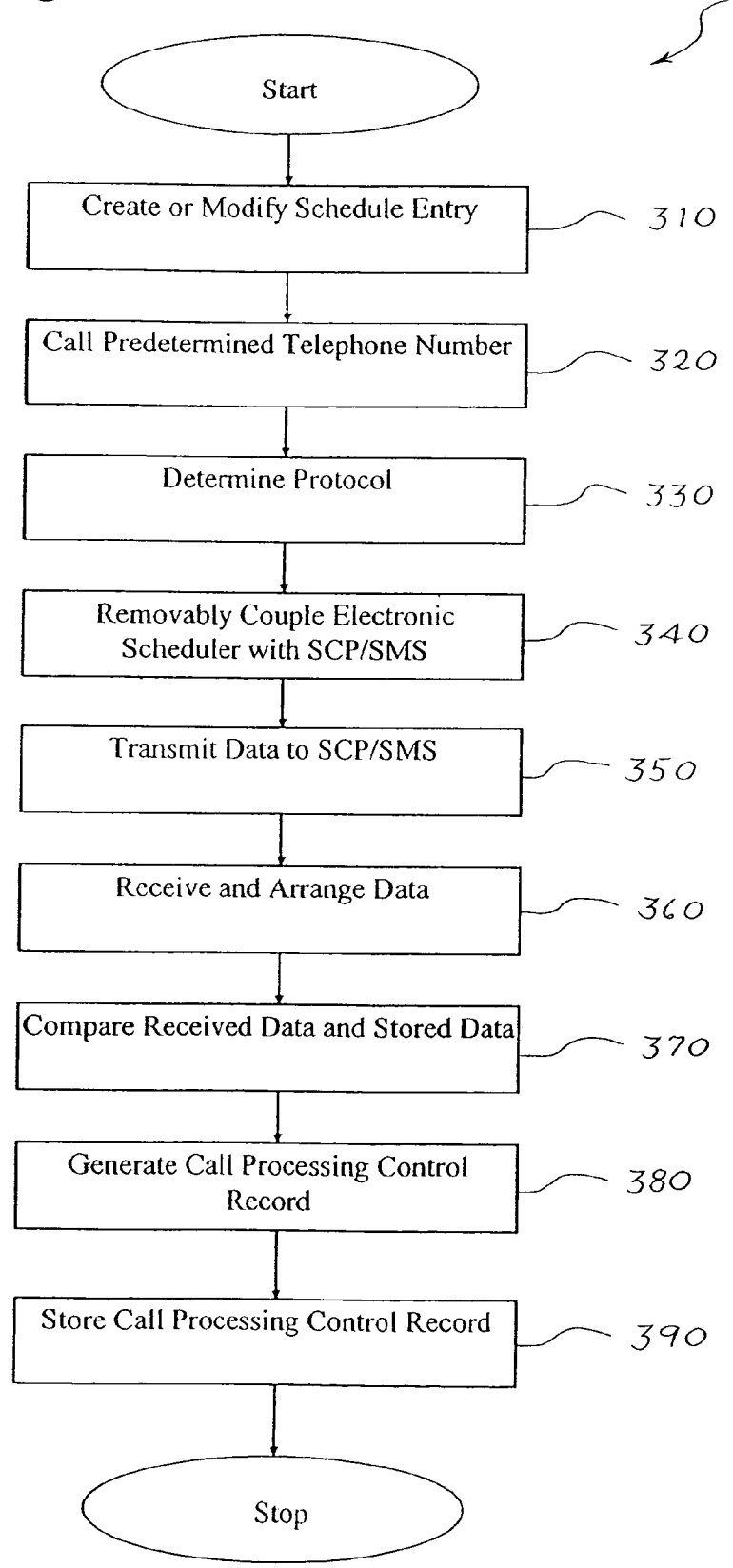
FIG. 5 is a more detailed flow chart of a first preferred embodiment the method of FIG. 2.

The systems depicted in FIGS. 3 and 4 can be utilized to implement the method 300 depicted in FIG. 5. In this embodiment, a user creates or modifies a schedule entry comprising a plurality of data entries using electronic scheduler 40 (step 310). A predetermined telephone number is called (step 320) to removably couple electronic scheduler 40 with SCP 240 or SMS 250. The telephone number can be dialed by the user or by the electronic scheduler 40 as known by those skilled in the art. When the telephone number is dialed, the call is routed to SSP 280 where it is sent to SCP 240 or SMS 250. SCP 240 or SMS 250 determines the protocol that electronic scheduler 40 is utilizing (step 330) through traditional handshaking procedures as known to those skilled in the art. In response to the determination of the protocol, electronic scheduler 40 is coupled with SCP 240 or SMS 250 (step 340) such that data is transmitted from electronic scheduler 40 to SCP 240 or SMS 250. The data entries are then transmitted from the electronic scheduler 40 to the SCP 240 or SMS 250 (step 350). The data entries can be transmitted as packet information as known to those skilled in the art. Alternatively, the data entries can be transmitted in accordance with synchronization procedures such as those provided by Microsoft's Active Sync software and Puma Technology's Intellisync software as known to those skilled in the art. When SCP 240 or SMS 250 receives the data, the data is automatically arranged into the appropriate fields that comprise the call processing control record (step 360). The received data is then compared to data stored in existing call processing control records (step 370). If there are differences between the data, a call processing control record is automatically generated by SCP 240 or SMS 250 in response to the data (step 380). The call processing control record is then stored in database 242 or SMS database 252 (step 390). Alternatively, the appropriate forwarding telephone number can be placed in the call forwarding number field of the SSP 220 as described herein.

Figure 6:
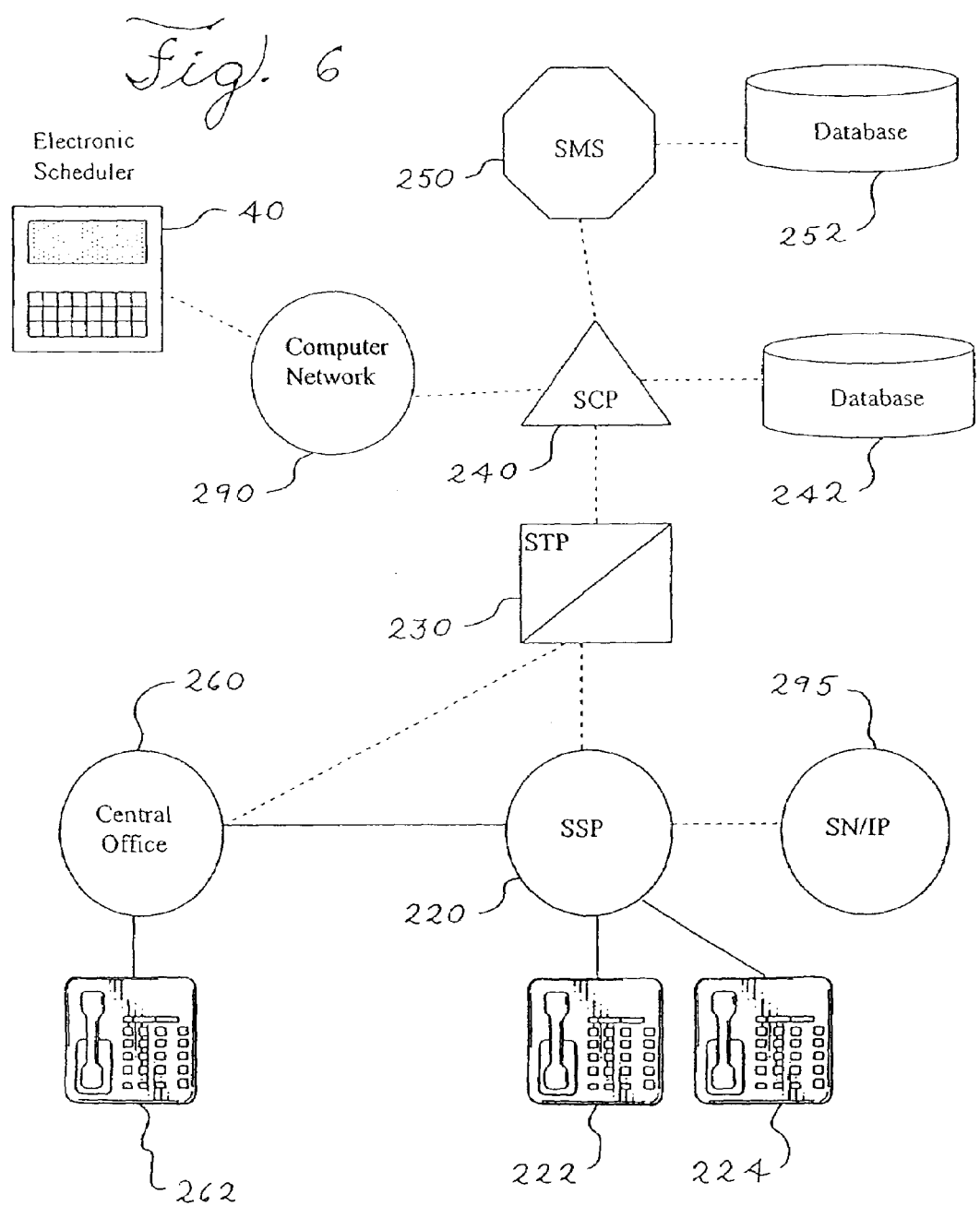
FIG. 6 is a block diagram of a third preferred embodiment of the telecommunications system of FIG. 1.

Referring now to FIG. 6, an alternate embodiment of the system of FIG. 3 is shown. In this embodiment, electronic scheduler 40 is removably coupled with a computer network 290 such that data is transmitted from electronic scheduler 40 to SCP 240. The computer network 290 preferably comprises the Internet. Alternatively, the computer network 290 can comprise any form of computer network configured to transmit data as known to those skilled in the art. The computer network 290 preferably utilizes a transmission protocol to enable the transmission of data from electronic scheduler 40 to SCP 240. One example of a suitable transmission protocol is TCP/IP as known to those skilled in the art. Alternatively, the transmission protocol can comprise X.25, a client-server protocol, or any other suitable transmission protocol as known to those skilled in the art or developed in the future.

Figure 7:
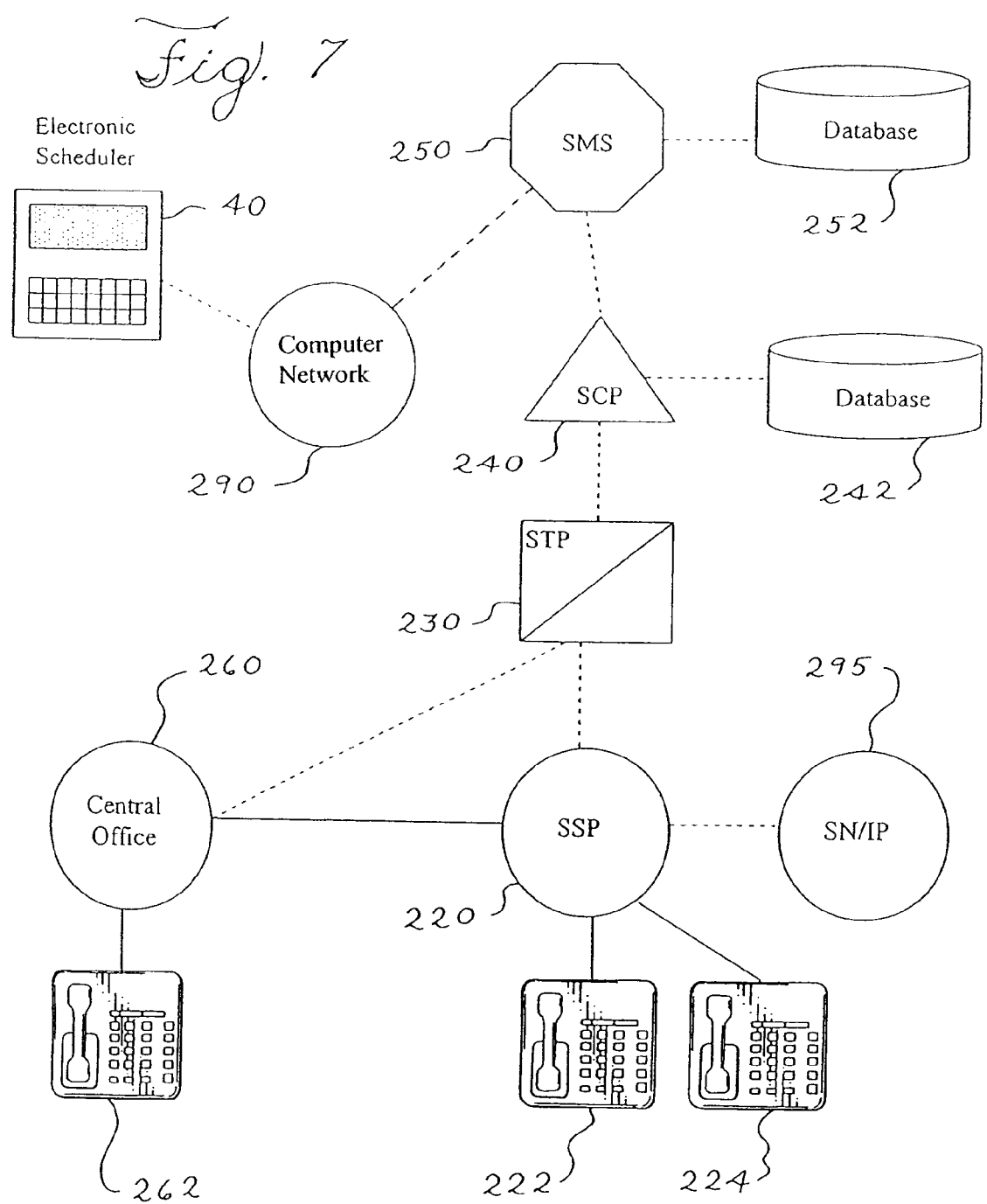
FIG. 7 is a block diagram of a fourth preferred embodiment of the telecommunications system of FIG. 1.

Referring now to FIG. 7, an alternate embodiment of the system of FIGS. 4 and 6 is shown. In this embodiment, the electronic scheduler 40 is removably coupled with computer network 290 such that data can be transmitted from electronic scheduler 40 to SMS 250 as described herein.

Figure 8:
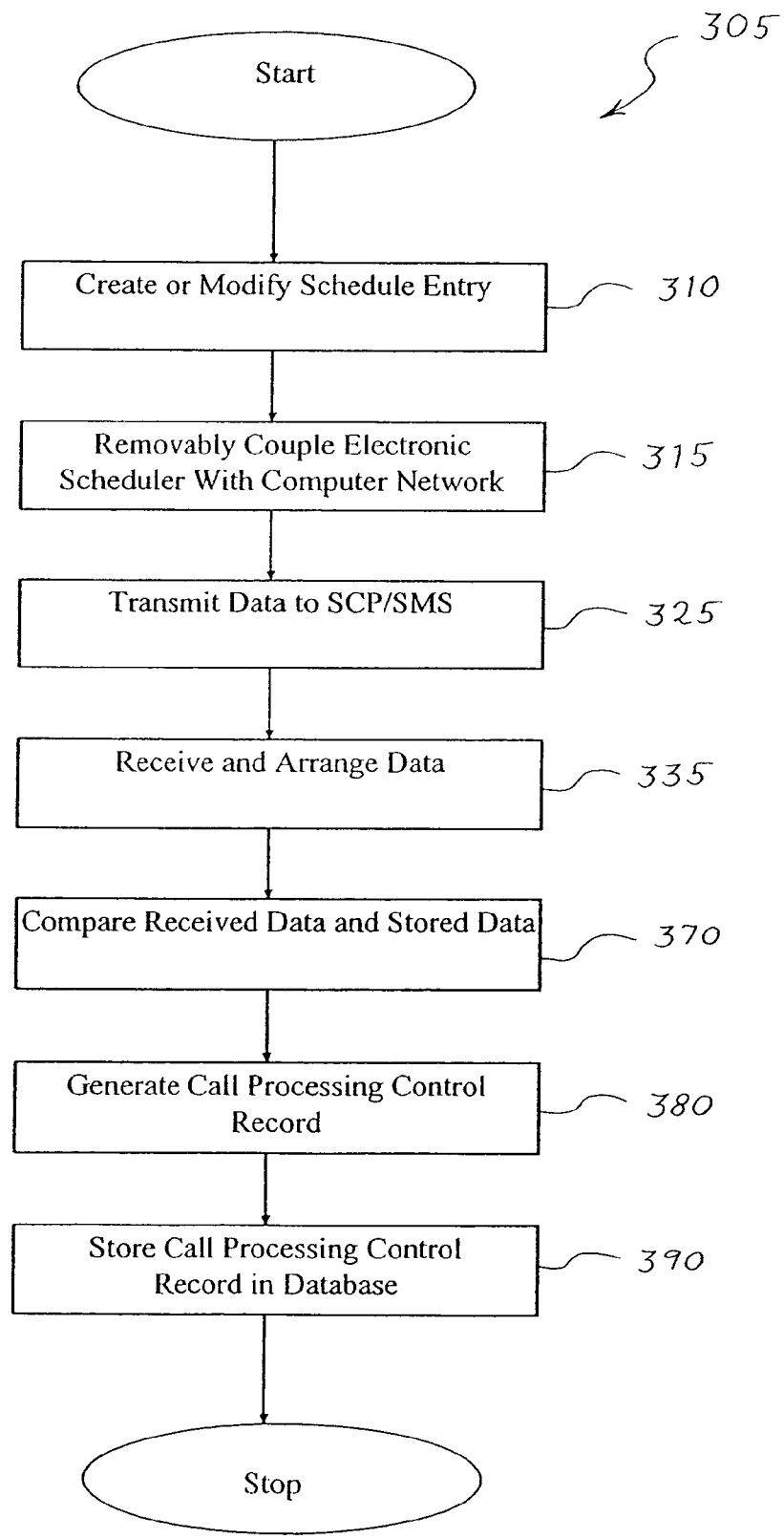
FIG. 8 is a more detailed flow chart of a second preferred embodiment the method of FIG. 2.

The systems depicted in FIGS. 6 and 7 can be utilized to implement the method 305 depicted in FIG. 8. In this embodiment, a user creates or modifies a schedule entry comprising a plurality of data entries using electronic scheduler 40 (step 310). The user then removably couples electronic scheduler 40 with computer network 290 (step 315). The electronic scheduler 40 and computer network 290 can be removably coupled through traditional dial-up procedures as known to those skilled in the art. Alternatively, electronic scheduler 40 and computer network 290 can be removably coupled through electronic transmissions of data as known to those skilled in the art. The data entries are transmitted from electronic scheduler 40 to SCP 240 or SMS 250 via the computer network 290 (step 325). The data entries can be transmitted as packet information as known to those skilled in the art. Alternatively, the data entries can be transmitted in accordance with synchronization procedures such as those provided by Microsoft's Active Sync software and Puma Technology's Intellisync software as known to those skilled in the art. When SCP 240 or SMS 250 receives the data, the data is arranged into the appropriate fields that comprise the call processing control record (step 335). The received data is then compared to data stored in existing call processing control records (step 370). If there are differences between the data, a call processing control record is automatically generated by SCP 240 or SMS 250 in response to the data (step 380). The call processing control record is then stored in database 242 or SMS database 252 (step 390). Alternatively, the appropriate forwarding telephone number can be placed in the call forwarding number field of the SSP 220 as described herein.

Figure 9:
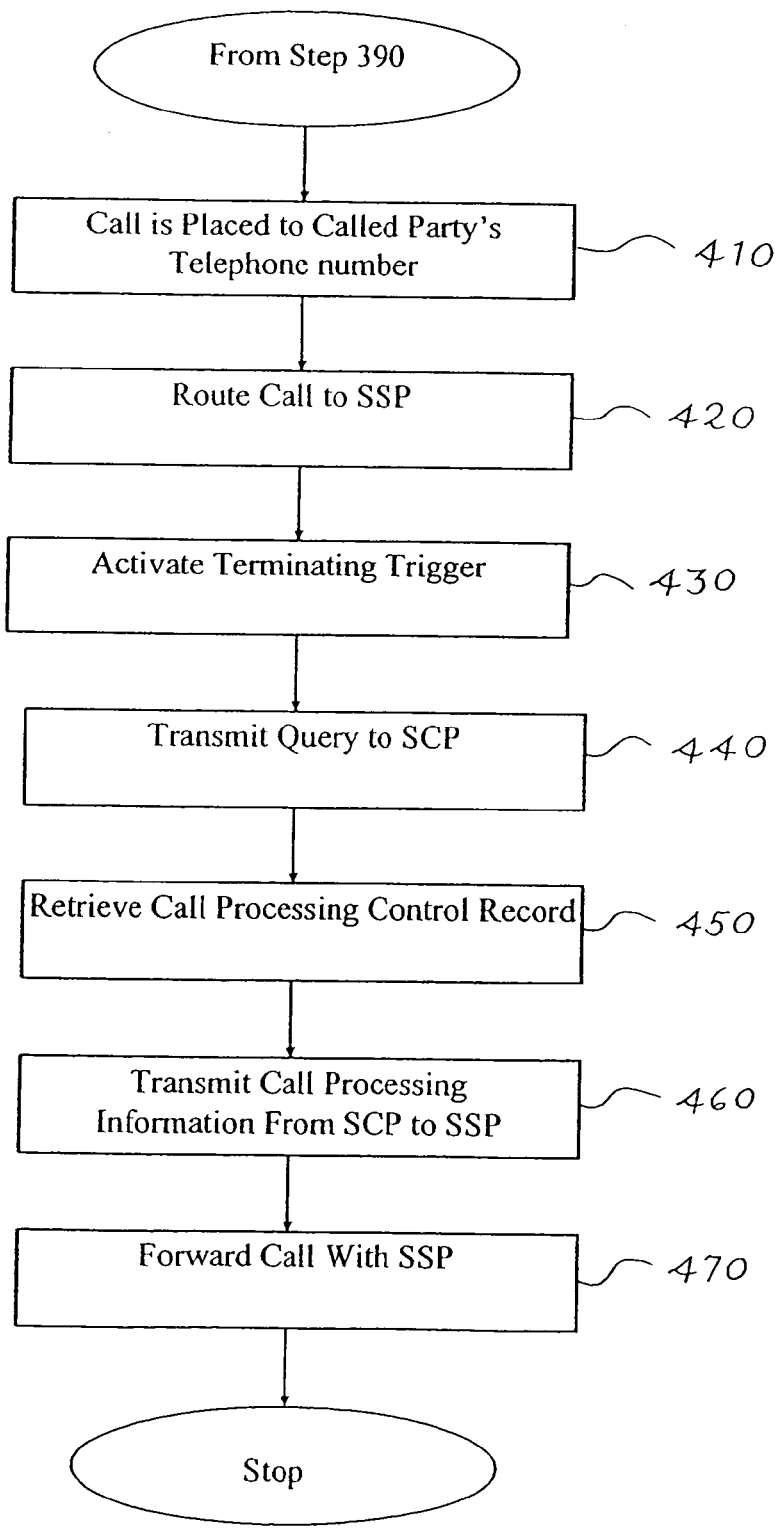
FIG. 9 is a flow chart of a method of a preferred embodiment for forwarding a call in response to a call processing control record.

Referring now to FIG. 9, a call placed to the called telephone station 222 is forwarded to the forwarding telephone station 224 in response to a call processing control record created in accordance with the above methods. Assume for purposes of this example that a call processing control record has been created in response to a schedule entry using the systems and methods described herein. The call processing control record indicates that during a prescribed time period, the user can be reached at the forwarding telephone station 224 instead of his/her normal location at the called telephone station 222. When a caller at calling telephone station 262 places a call to called telephone station 222 (step 410), the call is routed to SSP 220 (step 420). When SSP 220 receives the call, a terminating attempt trigger is activated (step 430). In response to the trigger, a query is generated and transmitted to SCP 240 (step 440). In response to the query, the SCP 240 accesses database 242 and retrieves the call processing control record created by the called party (step 450). The SCP 240 returns the appropriate call control information to SSP 220 (step 460) in response to the call processing control record. In response to the call control information, SSP 220 forwards the call to forwarding telephone station 224 (step 470).

Figure 10:
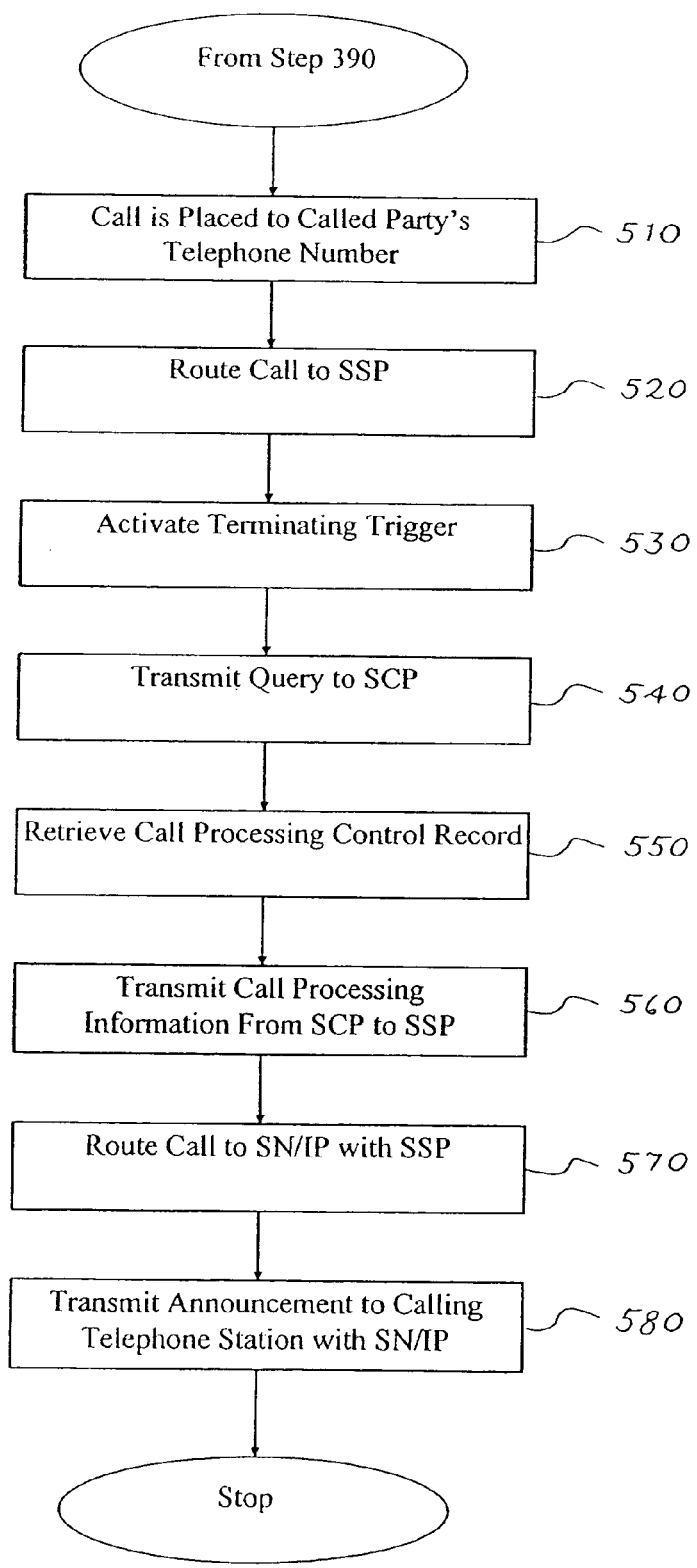
FIG. 10 is a flow chart of a method of a preferred embodiment for transmitting an announcement to a calling party in response to a call processing control record.

Referring now to FIG. 10, an announcement can be played to a calling party in response to a call processing control record created in accordance with the above methods when a call is placed to the called telephone station 222. Assume for purposes of this example that a call processing control record has been created in response to a schedule entry using the systems and methods described herein. The call processing control record indicates that during a prescribed time period, the user is unavailable and that an appropriate announcement should be played to the calling party when a call is placed to the user during the prescribed time. When a caller at calling telephone station 262 places a call to called telephone station 222 (step 510), the call is routed to SSP 220 (step 520). When SSP 220 receives the call, a terminating attempt trigger is activated (step 530). In response to the trigger, a query is generated and transmitted to SCP 240 (step 540). In response to the query, the SCP 240 accesses database 242 and retrieves the call processing control record created by the called party (step 550). The SCP 240 returns the appropriate call control information to SSP 220 (step 560) in response to the call processing control record. In response to the call control information, SSP 220 routes the call to SN/IP 295 (step 570). After receiving the call, SN/IP transmits an announcement to calling telephone station 262 (step 580). The announcement can indicate that the user is unavailable. In addition, the announcement can indicate a telephone number at which the user can be reached. Alternatively, the announcement can indicate that the user will return the call or that the calling party should try to reach the user at a later time.

It should be noted that in the case of an error involving the call processing control record whereby the call processing control record sought cannot be found or does not exist, the SCP 240 can be configured to complete the call as dialed.

In accordance with an alternative embodiments, different schemes can be used to indicate when the call processing control record is to be activated. For example, the hours in a year could be consecutively numbered and starting and ending hours could be used in place of the starting and ending dates and times. Alternatively, a duration field could be used in conjunction with a starting time and/or starting date in place of an ending time and/or date.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method for creating a call processing control record comprising:
   (a) receiving electronic schedule data;
   (b) comparing the electronic schedule data with stored data to determine if the electronic schedule data differs from the stored data; and
   (c) automatically generating a call processing control record if the electronic schedule data differs from the stored data, where the call processing control record comprises an indication of a user's selection of a particular announcement to be transmitted to a caller in response to a call being placed to the user during a certain time period.

2. The method of claim 1, wherein the electronic schedule data is received via a telecommunications network.

3. The method of claim 1, wherein the electronic schedule data is received via a computer network.

4. The method of claim 1, wherein the electronic schedule data is received via the Internet.

5. The method of claim 1, wherein the electronic schedule data is received via a computer network utilizing a TCP/IP protocol.

6. The method of claim 1, wherein the electronic schedule data is transmitted via a computer network utilizing a X.25 protocol.

7. The method of claim 1, further comprising:
   (d) receiving, at a switch, a call from a calling party;
   (e) accessing the call processing control record after receiving the call; and
   (f) transmitting an announcement to the calling party based upon the indication in the call processing control record.

8. The method of claim 7, wherein (e) comprises:
(e1) generating a query that is transmitted from a service switching point to a service control point; and
(e2) using the service control point to access the call processing control record.

9. The method of claim 7, wherein (f) comprises:
(f1) routing the call from the switch to a service node; and
(f2) using the service node to transmit the announcement to the calling party.

10. The method of claim 7, wherein (f) comprises:
(f1) routing the call from the switch to an intelligent peripheral; and
(f2) using the intelligent peripheral to transmit the announcement to the calling party.

11. The method of claim 7, wherein the announcement comprises an indication that the user is unavailable.

12. The method of claim 7, wherein the announcement comprises an indication of a telephone number at which the user can be reached.

13. The method of claim 1, wherein the indication of the user's selection of a particular announcement to be transmitted to the caller signifies that an announcement comprising a message that the user is unavailable should be transmitted to the caller.

14. The method of claim 1, wherein the indication of the user's selection of a particular announcement to be transmitted to the caller signifies that an announcement comprising an indication of a telephone number at which the user can be reached should be transmitted to the caller.

15. A system for creating a call processing control record comprising:
a call processing control record generator operative to:
receive electronic schedule data;
compare the electronic schedule data with stored data to determine if the electronic schedule data differs from the stored data; and
automatically generate a call processing control record if the electronic schedule data differs from the stored data, where the call processing control record comprises an indication of a user's selection of a particular announcement to be transmitted to a caller in response to a call being placed to the user during a certain time period.

16. The system of claim 15, wherein the call processing control record generator comprises a service management system.

17. The system of claim 15, wherein the call processing control record generator comprises a telecommunications network component.

18. The system of claim 17, further comprising a service node/intelligent peripheral coupled with the call processing control record generator, the service node/intelligent peripheral being responsive to the call processing control record and being operative to transmit an announcement to a calling telephone station in response to the call processing control record.

19. A computer usable medium having computer readable program code tangibly embodied therein for creating a call processing control record comprising:
a first computer readable program code for causing a computer to receive electronic schedule data;
a second computer readable program code for causing a computer to compare the electronic schedule data with stored data to determine if the electronic schedule data differs from the stored data; and
a third computer readable program code for causing a computer to automatically generate a call processing control record if the electronic schedule data differs from the stored data, where the call processing control record comprises an indication of a user's selection of a particular announcement to be transmitted to a caller in response to a call being placed to the user during a certain time period.

20. The invention of claim 19, further comprising a fourth computer readable program code for causing a computer access the call processing control record in response to the receipt of a call directed to the user.

21. The invention of claim 19, further comprising a fourth computer readable program code for causing a computer to transmit an announcement to the caller based upon the indication in the call processing control record.

* * * * *